E. F. MILLS.
PRESSURE GAUGE.
APPLICATION FILED SEPT. 10, 1920.
1,430,097.
Patented Sept. 26, 1922.
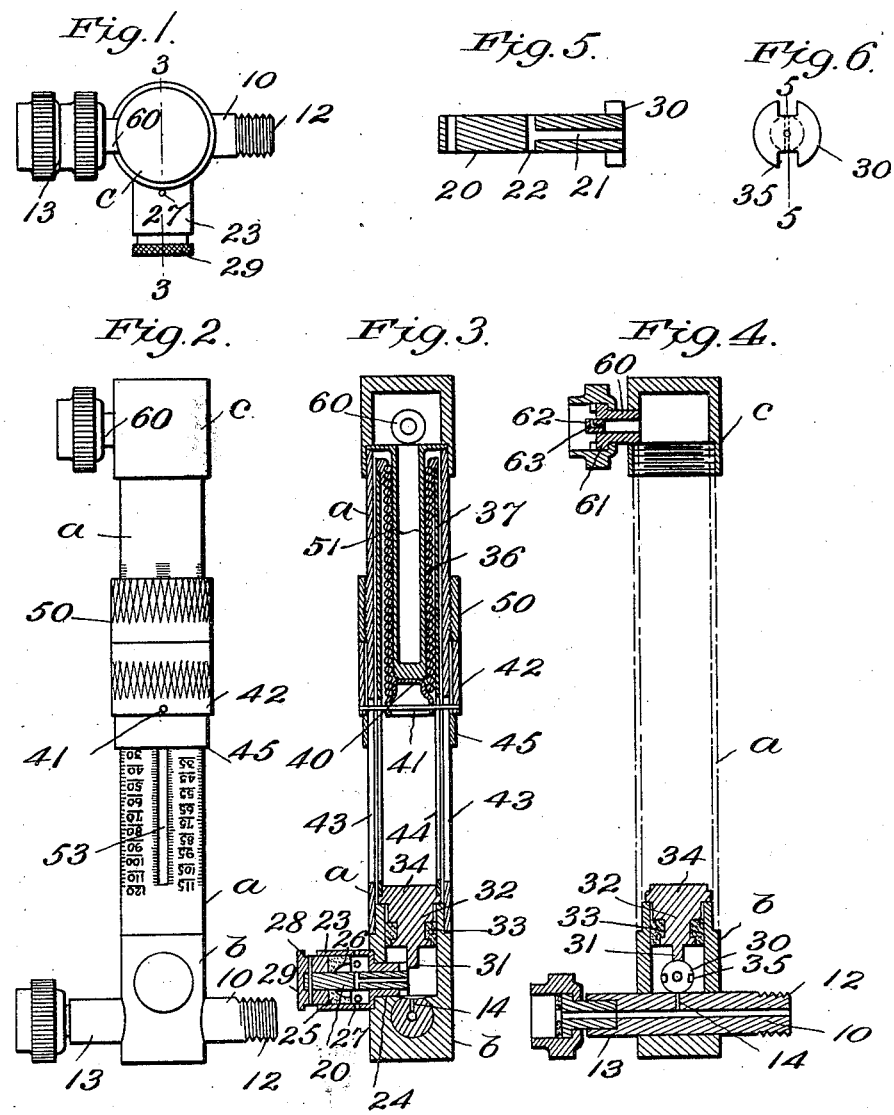

Patented Sept. 26, 1922.

1,430,097

UNITED STATES PATENT OFFICE.

EDWARD FRANK MILLS, OF LYNN, MASSACHUSETTS.

PRESSURE GAUGE.

Application filed September 10, 1920. Serial No. 409,324.

*To all whom it may concern:*

Be it known that I, EDWARD FRANK MILLS, a citizen of the United States of America, residing in Lynn, in the county of Essex and State of Massachusetts, have invented certain new and useful Improvements in Pressure Gauges, of which the following is a specification.

This invention relates to an instrument or gauge actuated by fluid pressure, and is herein shown as embodied in a gauge or instrument with which the transmission of fluid pressure from a suitable source of supply to a receptacle, may be automatically interrupted when the pressure in said receptacle reaches a predetermined point or amount, and with which the amount of pressure in said or any other receptacle may be determined and indicated.

The invention is especially applicable among other uses to be employed in connection with pneumatic tires of automobiles, whereby the latter are prevented from being excessively inflated, and whereby the amount of pressure in the tire may be indicated.

The preferred form of the instrument is herein shown and is provided with a relief valve of novel construction as will be described, which is locked both in its closed and opened positions by a piston actuated by a tension spring, which latter is operatively connected at one end to said piston to be elongated by a push upon the spring by fluid pressure acting against said piston, and has its other end operatively connected to a device, which is moved by fluid pressure applied to the spring, so as to elongate the same by pushing upon the end of the spring opposite to that which is moved by fluid pressure applied to the piston.

Provision is made for enabling the indicated pressure to be read after the device has been disconnected from the receptacle containing the pressure to be determined.

These and other features of this invention will be pointed out in the claims at the end of this specification.

Figure 1 is a plan view of an instrument embodying this invention.

Fig. 2, an elevation of the instrument shown in Fig. 1.

Fig. 3, a longitudinal section on the line 3—3, Fig. 1, with the relief valve in its open position.

Fig. 4, a view in elevation and section showing the relief valve in its closed and locked position.

Figs. 5 and 6, details of the relief valve stem on an enlarged scale.

In the present instance, I have shown one embodiment of the invention, in which a cylindrical casing $a$ is provided at its opposite ends with removable cylinders $b$, $c$. The cylinder $b$ has extended through it transversely a pipe 10, which projects beyond the said cylinder at both ends, and one end as 12 is designed to be connected with a source of fluid under pressure, and the other end as 13 is designed to be connected with the tire or other receptacle to be filled with fluid under pressure.

The pipe 10 is provided with a port 14 which connects the pipe with the interior of the cylinder $b$, so that the latter is supplied with fluid under pressure.

The cylinder $b$ is provided with a relief valve of novel construction, which is normally closed as long as the pressure in the cylinder $b$, which is the same as that in the tire or other receptacle per square inch, remains below a predetermined amount, but which is automatically opened when the fluid pressure reaches the predetermined amount.

The relief valve is preferably made as herein shown and consists of a stem or rod 20, provided with a longitudinal passage or port 21 extended from the inner end of said stem or rod toward the longitudinal center thereof, where it communicates with a transverse port or passage 22 (see Figs. 3 and 5), which communicates with a cylindrical casing 23 of larger diameter than the said stem or rod, and provided with an extension 24 whose internal diameter is substantially the same as that of the said stem or rod. The extension 24 forms a bearing in which the valve stem or rod 20 slides. The valve stem or rod 20 has mounted on it a piston valve 25, preferably of leather or other flexible or yielding material, which is provided at its front end with a recess or cavity 26, to provide the front end of the valve with a circumferential wall of reduced thickness, which is capable of being firmly pressed outwardly into contact with the cylinder 23 by the pressure in the cavity or recess 26, thereby ensuring a fluid-tight contact of the valve with its casing or cylinder 23, and consequently ensuring closure of the outlet port or ports 27 in the casing or cylinder when the relief valve is closed.

The valve stem or rod 20 is made longer than its cylinder 23, and its outer end is extended beyond its cylinder and has fastened to it, as by the pin 28, a head 29, by means of which the relief valve may be readily moved into its closed position by hand. The head 29 is made long enough to extend into the valve casing or cylinder 23 and its inner end is of substantially the same diameter as the casing, so that when the relief valve is in its open position, its rod or stem 20 is supported at its opposite ends in bearings, namely, at its front end by the valve casing 23 and at its rear end by the extension 24 of said casing.

As a result liability of the valve stem being bent or distorted so as to render it difficult to open and close the valve and thereby render the instrument inoperative or at least inaccurate, is avoided.

Provision is made for locking the relief valve in its closed and opened positions.

To this end, the valve stem 20 is provided on its inner end with a collar or annular flange 30 (see Figs. 5 and 6), which has co-operating with it a stud or projection 31 extended from the lower face of a piston 32, which has its lower portion movable in the cylinder $b$ and has its upper portion movable in the casing $a$.

The lower end of the piston 32 is rendered air-tight in the cylinder $b$ by means of suitable packing 33 (see Fig. 3), and the upper portion of the piston, which is movable in the casing $a$ is made of larger diameter than the cylinder $b$ so as to form a head 34, which co-operates with the end of the cylinder $b$ to limit the movement of the piston 32 toward the relief valve, and thereby prevent the projection 31 from engaging the stem of the relief valve when the latter is in its closed position, and consequently preventing pressure being applied to the inner end of the valve stem and bending or cramping the same, so as to distort it and render it difficult to move either by pressure or by hand.

The stud or projection 31 co-operates with the flange or collar 30 to form a locking device for the relief valve, and the flange or collar is provided with one or more slots 35, with relation to which the projection 31 is made of such width as to readily pass through the same when the slot is in alignment with said projection.

In the present instance, the flange or collar 30 is provided with two slots 35, which are arranged substantially diametrically opposite, and one of which is used when it is desired to close the relief valve by hand.

The slot 35 permits the collar or flange 30 to be moved from one side of the projection 31 to the other side thereof, when the latter is in its operative position, into which it is moved by a tension spring 36, as soon as the pressure in the cylinder $b$ falls below the predetermined amount.

The tension spring 36 is located within a tube 37, which is attached to the piston 32 and forms a hollow piston rod, said spring being suitably fastened to the upper or outer end of the piston rod and having its lower or inner end fastened to a cup or head 40, which is connected by a pin 41 with a sleeve 42, mounted to slide on the outside of the cylinder or casing $a$. The sleeve 42 is permitted to be moved longitudinally on the casing $a$, by providing the latter and the hollow piston rod 37 with longitudinally extended substantially diametrically opposite slots 43, 44, through which the opposite ends of the pin are extended and in which said pin moves and is guided thereby.

The sliding sleeve 42 has co-operating with it a small sleeve or collar 45, which is movable with the sleeve 42 in one direction and remains in the position into which it is moved by the sleeve 42, until the collar 45 is moved in the opposite direction by hand. The collar 45 constitutes one form of indicator, as will be described. The sleeve 42 is normally held by the contraction of the spring 36 against a stop in the form of a sleeve or collar 50, which is in threaded engagement with the casing or cylinder $a$ and is adjustable thereon.

The sleeve 42 is moved on the casing $a$ against the tension of the spring 36 by fluid pressure applied to the cup or head 40 through the medium of an expansible member 51, which is preferably made as a hollow bag of rubber or other elastic material and which is open at its upper end to communicate with the chamber or cylinder $c$, which latter is detachable from the casing or cylinder $a$ and normally clamps the open end of the bag 51 between it and the end of the casing $a$, so as to anchor the expansible member or bag 51 at its open end. It will therefore be seen that when pressure is admitted into the cylinder $c$, it passes into the bag 51 and expands the latter in the direction of its length, thereby causing the closed end of the bag to push against the head 40 and move the latter in the hollow piston rod 37 against the tension of the spring 36, which latter is in this case anchored at is upper end by the hollow piston rod 37.

As the head 40 is moved in the hollow piston rod 37, it carries with it the sleeve 42, which in turn moves the indicator collar 45, and the latter co-operates with graduations 53 on the outside of the casing $a$ to indicate the pressure in the bag 51 and cylinder $c$, and thereby indicate the pressure in a tire or other receptacle with which the cylinder $c$ is connected.

The cylinder $c$ is provided with a fluid inlet pipe 60 (see Fig. 4), with which the valve of a tire or other receptacle is designed to be connected in a manner well understood.

The pipe 60 is provided at its outer end, as herein shown, with a head 61, through which extends a screw 62 having a port or passage 63 through which air or other fluid enters into the pipe 60 and cylinder $c$.

The screw 62 is provided with a head at its outer end, which is designed to be engaged by the stem of the air valve employed in the inner air tube of tires now commonly employed on automobiles, and effects the opening of said air valve by pressing the latter against the head of the screw 62, thereby connecting the air tube with the cylinder $a$ through passage 63 and pipe 60.

From the above description, it will be seen that with the instrument herein shown, the amount of fluid pressure which can be supplied to a receptacle may be predetermined, and that the amount of pressure in the same or a different receptacle can be determined.

When it is desired to predetermine the pressure pumped or otherwise supplied to a tire or other receptacle, the relief valve 25 is moved by hand into its closed position, by turning the valve stem 20 until one of the slots 35 registers with the projection 31, and then pushing the valve 25 in its cylinder 23 until the ports 27 are closed, at which time the collar 30 is moved beyond the projection 31, after which the valve is given a quarter turn to bring a solid part of the collar in position to engage the projection 31, and thereby lock the relief valve in its closed position.

This relation of the collar 30 to the projection 31 is shown in Fig. 4:

The pressure at which the relief valve may be opened, is controlled by means of the threaded sleeve or collar 50, which can be turned on the casing so as to place the spring 36 under the tension desired or required, in order to obtain in the tire or other receptacle the desired or predetermined amount of pressure.

Let it be assumed that the gauge is set to interrupt the flow of fluid pressure from the supply to the tire, when the pressure in the latter reaches eighty pounds. In this case, the sleeve 50 is rotated until the indicator 45 reaches the graduation marked 80 on the casing $a$, which action places the spring under such tension as to require a pressure of eighty pounds in the cylinder $b$ to move the piston 32 sufficiently to carry the projection 31 clear of the collar 30 and thus unlock the relief valve 25, which is instantly moved by the fluid pressure to spill into the atmosphere, thereby preventing the pressure from rising in the tire above the predetermined amount.

The pressure exerted upon the piston 32 causes the hollow piston rod 37 to move the free or upper end of the spring 36, the lower end being anchored by the sleeve 50 through the sleeve 42, pin 41, and head 40.

The supply of pressure to the tire is now manually cut off at the source, if the operator is attending to his business, and if he is not or is otherwise engaged, over inflation of the tire cannot take place, as the relief valve remains open until manually closed.

After the instrument has been disconnected from the tire, the relief valve is moved by the operator into its cylinder until the head 29 of the valve stem 20 engages the end of the cylinder $b$, at which time the ports 27 are closed by the valve 25 and the collar 30 has been moved to the other side of the projection 31, which has been moved into its operative or starting position by the spring 36 as soon as the fluid pressure acting on the piston falls below the predetermined amount. The valve stem 20 is then turned, preferably about a quarter turn to bring a solid portion of the collar 30 in line with the projection 31, as shown in Fig. 4, and the relief valve is thus locked in its closed position.

If it is desired to determine the pressure in the tire or in any other receptacle, the cylinder $c$ at the opposite end of the casing $a$ is connected with the said tire and the pressure therefrom flows through the port 63 and pipe 60 into said cylinder and thence into the expansible bag 51. Before connecting the cylinder $c$ with the tire, the threaded sleeve 50 is turned back, and the indicator collar 45 is moved back to zero on the scale. The fluid pressure admitted into the bag 51 elongates the latter and pushes the head 40 and the sleeve 42 connected therewith and moves the indicator 45 over the scale. As the head 40 is pushed upon by the fluid pressure, it carries with it the end of the spring 36 connected therewith and elongates said spring, as the latter is anchored at its opposite end by the piston rod 37, which is now stationary.

The collar 45 is thus moved to the graduation corresponding to the pressure in the bag 51, which is the same as that in the tire or other receptacle.

From the above description, it will be seen that the spring 36 is elongated in one direction by pressure applied to the piston 32, which is connected with one end of the said spring, and is elongated in the opposite direction by pressure applied to the head 40, which is connected with the other end of said spring.

It is preferred to provide a single instrument with which a fluid pressure may be predetermined, and also with which a fluid pressure may be determined, but it is not desired to limit the invention in this respect as the construction for predetermining the pressure may be used alone.

What I claim is:—

1. In a fluid pressure gauge, in combination, a casing, a cylinder connected with one end of said casing, a piston in said cylinder having a projection extended into the said cylinder and a piston rod extended into said casing, a relief valve for said cylinder having a stem extended into said cylinder and provided with a collar co-operating with said projection to enable said relief valve to be locked by said projection in its closed and opened positions, a tension spring in said casing having one end connected with said piston rod, a movable head in said casing with which the opposite end of said spring is connected, a device movable on the outside of said casing and connected with said head to move therewith, and an expansible member located in said casing and co-operating with said head and responsive to fluid pressure to effect movement of said head and said device in opposition to said spring.

2. In a fluid pressure gauge, in combination, a casing, a cylinder connected therewith and provided with a fluid inlet port, a relief valve for said cylinder, a piston in said cylinder, means movable with said piston and cooperating with the relief valve for locking the said relief valve in both its closed and opened positions, a tension spring located in said casing and having one end connected with said piston, a device movable on the outside of said casing and connected with the other end of said spring, and an expansible member located in said casing and cooperating with said spring to move it and said external device in response to fluid pressure exerted upon said expansible member.

3. In a fluid pressure gauge, in combination, a casing provided with a relief valve, and with a piston co-operating with the relief valve and normally holding said relief valve in its closed position, means within said casing co-operating with said piston to hold it in operative relation to maintain said valve in closed position and said piston being responsive to a predetermined fluid pressure admitted into one end of said casing and acting on said piston to release said valve, an indicator on the outside of said casing and connected with said means to be moved on said casing by fluid pressure admitted into the other end of said casing.

4. In a fluid pressure gauge, in combination, a casing provided within it with movable means responsive to a predetermined fluid pressure admitted into one end of said casing to permit the venting of excessive fluid pressure from said casing, and on its exterior with a movable indicator responsive to fluid pressure admitted to the opposite end of said casing, and a common resilient means for opposing movement of said pressure responsive means and indicator when under the influence of fluid pressure.

5. In a fluid pressure gauge, in combination, a casing, a tension spring therein, means within said casing connected with one end of said spring and movable against the tension thereof in response to a predetermined fluid pressure admitted into one end of the casing, a relief valve adapted to open upon movement of said means, and a device on the outside of said casing connected with the other end of said spring movable in response to fluid pressure admitted into the other end of said casing to indicate said pressure.

6. In a fluid pressure gauge, in combination, a casing, a spring located in said casing, a device connected with one end of said spring and movable against the action thereof in response to fluid pressure admitted into said casing at one end thereof, a relief valve adapted to open upon movement of said device, and an indicating device connected with the other end of said spring and responsive to fluid pressure admitted into the other end of said casing to indicate the pressure.

7. In a device of the character described, in combination, a casing provided with a blow-off means and a pressure indicating means, each of said means being operative through the medium of a separate pressure responsive member, and a common resilient element within the casing opposing the movements of both pressure responsive members.

8. In a device of the character described, in combination, a casing having means at each end adapted to be connected with a source of fluid pressure, a piston in said casing movable by fluid pressure admitted at one end and cooperating with a relief valve, a pressure indicating means responsive to fluid pressure admitted at the other end of the casing, and a common resilient means for resisting movement of the piston and pressure indicating means.

In witness whereof, I have hereunto signed my name.

EDWARD FRANK MILLS.